United States Patent
Bae

[11] Patent Number: 5,928,506
[45] Date of Patent: Jul. 27, 1999

[54] WATER PURIFIER FOR DRINKING WATER

[75] Inventor: Kyung Suk Bae, Seoul, Rep. of Korea

[73] Assignee: Waters Co., Ltd., Rep. of Korea

[21] Appl. No.: 08/916,938

[22] Filed: Aug. 21, 1997

[30] Foreign Application Priority Data

Dec. 26, 1996 [KR] Rep. of Korea ............... 96-72267

[51] Int. Cl.⁶ .................................. B01D 35/027
[52] U.S. Cl. ................ 210/94; 210/123; 210/124; 210/206; 210/266; 210/282; 210/284; 210/257.1; 210/337
[58] Field of Search .............. 210/94, 121–124, 210/257.1, 266, 282, 284, 455, 464, 337, 206

[56] References Cited

U.S. PATENT DOCUMENTS

| | | | |
|---|---|---|---|
| 195,423 | 9/1877 | Vent | 210/109 |
| 316,885 | 4/1885 | Dumont | 210/284 |
| 590,020 | 9/1897 | Myers | 210/265 |
| 611,691 | 10/1898 | Langdon et al. | 210/323.2 |
| 636,447 | 11/1899 | Paddock | 210/264 |
| 826,654 | 7/1906 | Firth | 210/129 |
| 1,378,274 | 5/1921 | Probst | 210/806 |
| 1,433,357 | 10/1922 | Ellis | 210/125 |
| 1,628,510 | 5/1927 | Perry | 210/202 |
| 2,239,612 | 4/1941 | Lawlor | 210/117 |
| 5,180,491 | 1/1993 | Polasky | 210/282 |
| 5,562,824 | 10/1996 | Magnusson | 210/266 |

*Primary Examiner*—Jay H. Woo
*Assistant Examiner*—Fred Prince
*Attorney, Agent, or Firm*—Tilton, Fallon, Lungmus & Chestnut

[57] ABSTRACT

A water purifier using common advantages of natural and forced types operated without an external electric power source, resulting in high efficiency of water purification. The apparatus for purifying water includes a first water-supply pipe for transporting running water with a predetermined pressure, a second water-supply pipe for pumping the running water to the highest position of the apparatus, a first purifying section for temporarily storing and purifying the water provided by the second water-supply pipe as water flows down by its own gravitational force, a second purifying section for temporarily storing and purifying the water passing through the first purifying section as water flows down by its own gravitation force, and a transparent storage section for storing the water passing through the second purifying section, wherein the first and second purifying sections detect the water levels which fill up from the transparent storage section to the first and/or second purifying sections, thereby control the inflow of water from the second water-supply pipe in accordance with the existing water levels in the first and second purifying sections.

4 Claims, 3 Drawing Sheets

5,928,506

WATER PURIFIER FOR DRINKING WATER

BACKGROUND OF THE INVENTION

1. Field of the Invention

The present invention relates to a water purifier which can detect the consumption of purified water and substitute the consumed water with a fresh supply of purified water without the use of an external electric power source, thereby always maintaining a predetermined amount of purified water accessible for further use.

2. Description of the Prior Art

Water is one of the indispensable elements of human life. The quantity of water required by an average human body amounts to several liters per day.

The origin of human civilization can be traced back to geographical areas having sufficient water systems. Recently, numerous dams and wells have been constructed in an effort to efficiently use or obtain water.

In proportion to industrial progress, however, large quantities of polluted water are inevitably generated. The polluted water affects the rivers as well as underground streams by contaminating the water beneath the surface of the ground. As a result, most people feel hesitant about drinking natural water or running water provided by the city water system. Thus, at the present time, boiling or purifying treatments performed by a water purifier is absolutely necessary before running water is to be consumed.

Generally, water purifiers are classified into natural-type and forced-type purifiers.

In natural-type purifiers, natural water or running water has to be manually loaded onto the purifier's reservoir. Then, the purifier employing an active carbon and plurality of filters purifies the water stored in the reservoir while the water flows down to the transparent storage case by its own gravitational force.

In the natural-type purifier, however, the water level of the reservoir or transparent storage case has to be checked directly by human vision so as to manually substitute the depleted natural or running water. The purification ability of natural-type purifier, which does not require electronic device or external power source, is superior to that of the forced-type purifier. On the other hand, the forced-type purifier includes electronic devices for depleting the water level in the reservoir, and a motor for automatically substituting the water in accordance with the detected water level. Thus, the forced-type purifier forcibly pumps the water stored in the reservoir by the motor's operation, and subsequently purifies with rapid speed.

In the forced-type purifier, however, peripherals equipments such as a motor, pump, and electronic sensor are necessarily required. Thus, the cost of the forced-type purifier is much greater than that of the natural-type. Furthermore, the water passes rapidly through the forced-type filter at high pressure. Therefore, the filter is more easily damaged from high-pressure flow.

SUMMARY OF THE INVENTION

The object of the present invention is to solve the foregoing problems and provide a water purifier which can detect the consumption of purified water and substitute the consumed water with s fresh supply of purified water without the use of an external electric power source, thereby always maintaining a predetermined amount of purified water accessible for further use.

In order to achieve the above object, the present invention provides an apparatus for purifying water which comprises a first water-supply pipe for transporting running water with a predetermined pressure, a second water-supply pipe for pumping the running water to the highest position of the apparatus, a first purifying section for temporarily storing and purifying the water provided from the second water-supply pipe as water flows down by its own gravitational force, a second purifying section for temporarily storing and purifying the water passing through the first purifying section as water flows down by its own gravitational force, and a transparent storage section for storing the water passing through the second purifying section, wherein the first and second purifying sections detect the water levels, which fill up from the bottom of the transparent storage section up to the first and/or second purifying sections, thereby controlling the inflow of water provided from the second water-supply pipe in accordance with the existing water levels in the first and second purifying sections.

BRIEF DESCRIPTION OF THE DRAWINGS

The above object, other characteristics, and advantages of the present invention will become more apparent by describing in details a preferred embodiment thereof with reference to attached drawings, in which.

DETAILED DESCRIPTION OF THE INVENTION

Figure 1:
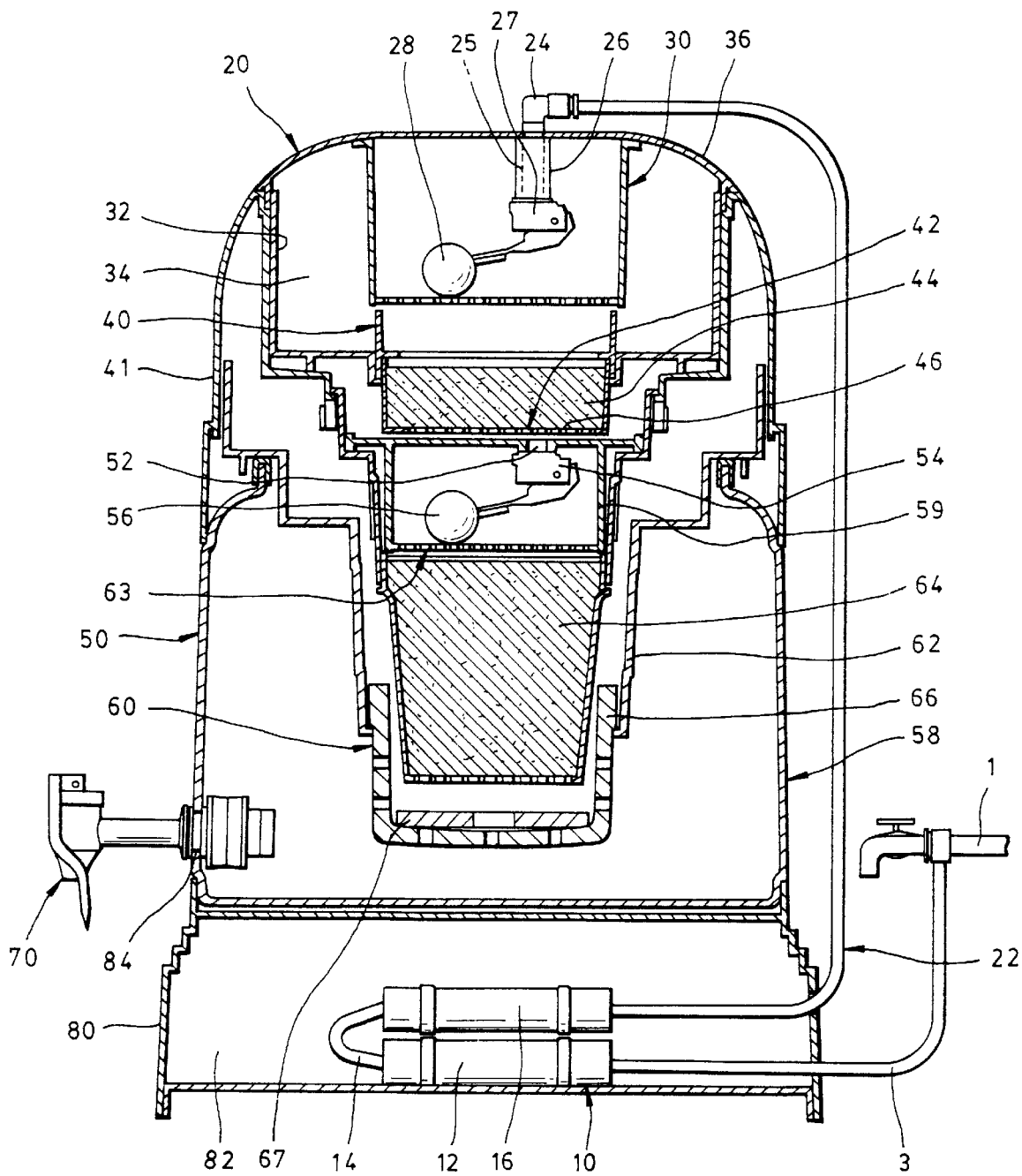
FIG. 1 is a cross-sectional view showing an apparatus for purifying water according to a first preferred embodiment of the present invention.
Figure 2:
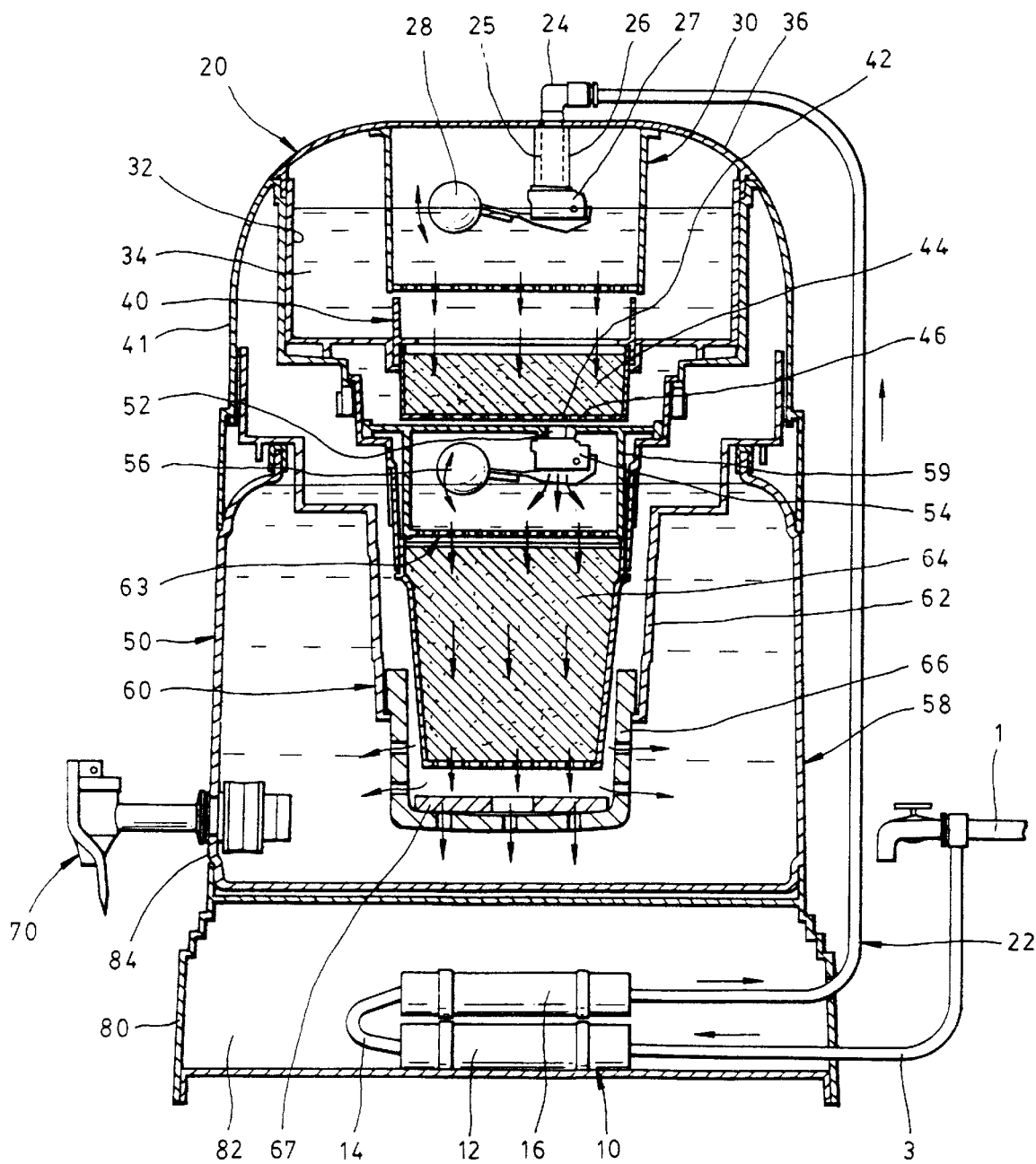
FIG. 2 is a cross-sectional view showing an operation state of the apparatus for purifying water according to the present invention.

Hereinafter, the preferred embodiment of the present invention will be explained in details with reference to the accompanied drawings.

As shown in FIGS. 1 to 4, a water purifier according to the present invention includes a first water-supply pipe 1 for transporting running water to the water purifier with a predetermined pressure, a preliminary filtering section 10 for the primary filtration of solid particles, rust stains, and residues of heavy metal contained in the water provided from a first water-supply pipe 1, a second water-supply pipe 22 for pumping the water to the highest position of the apparatus by the pipe's own pressure, a first storage section 20 for temporarily storing the water provided from the second water-supply pipe 22 in a predetermined space, a first filtering section 40 for filtering the water stored in the first storage section 20 as water flows down by its own gravitational force, a second storage section 50 for temporarily storing the water passing through the first filtering section 40, a second filtering section 60 for filtering and ionizing the water stored in the second storage section 50 as the water flows down by its own gravitational force, a transparent storage case 58 for storing the water passing through the second filtering section 60, a faucet 70 installed at the front bottom side of the transparent storage case 58, and a base 80 for installing the preliminary filtering section 10.

The preliminary filtering section 10 includes a primary filter 12 for filtering the solid particles and rust stains contained in the running water provided from an water supply hose 3, a connecting hose 14 for transporting the water passing through the water supply hose 3, and a secondary filter 16 for filtering residues of heavy metal passing through the primary filter 12.

The first purifying section includes the first storage section 20 and the first filtering section 40 while the second purifying section includes the second storage section 50 and second filtering section 60.

The first storage section 20 includes an elbow 24 for changing the inflow of the water provided from the second water-supply pipe 22, an inflow pipe 26, having an inlet 25, for guiding the water passing through the elbow 24, a reservoir 32 having with a predetermined shape for storing the water passing through the inflow pipe 26, a float 28 for detecting the water level stored in the storage space 34 located within the reservoir 32, a shut-off valve 27 for controlling the inflow of water stored in storage space 34 in accordance with the water level detected by float 28, a cover 36 for opening or closing an upper surface of the storage case 34, and a float cover 30 connected to a lower surface of the cover 36 for supporting the float 28.

The first filtering section 40 includes an upper filter 44 for filtering the water as the water flows down by its own gravitational force, a upper porous plate 42 for guiding the inflow of water flowing down from the first storage section 20 by its own gravitational force, and a supporter 41 connected to a lower portion of the reservoir 32 for collecting the water passing through upper filter 44.

The second storage section 50 includes a lower inlet 52 for guiding the inflow of water passing through the filtering section 40, a float 56 for detecting the level of water in the storage case 59, a shut-off valve 54 for controlling the water level detected by float 56.

The second filtering section 60 includes a lower porous plate 63 for guiding the inflow of water passing through a lower inlet 52 as water flows down by its own gravitational force, a lower filter 64 for filtering the water passing through lower porous plate 63, an inner storage case 62 partially fixed to an upper surface of the transparent storage case 58, and a ceramic case 66 attached to the lower portion of the inner storage case 62 for projecting bio-infrared rays to the water passing through the lower filter 64.

In accordance with following equation P=F/A, the floats 28 and 56 bearing 6 Kg/cm$^2$ sufficiently able to withstand the running water pressure of 3–4 Kg/cm$^2$. (wherein P: pressure for the water; F : force applied to a sectional area of the float axle $\phi$ 2 mm; and A: area of the float axle $\phi$ 2 mm to which the force is applied.

A diskette 67 having an alkalite component is installed to a lower surface of the ceramic case 66. The diskette 67 contains silicon oxide, aluminum oxide, iron oxide II, calcium oxide, and potassium oxide. The diskette 67 vitalizes the filtered water into ionized water. The water taste is thereby enhanced by vibrating the water molecules and beneficial elements for human body would be preserved. As a result, the freshness of water is maintained for a long time.

Figure 4:
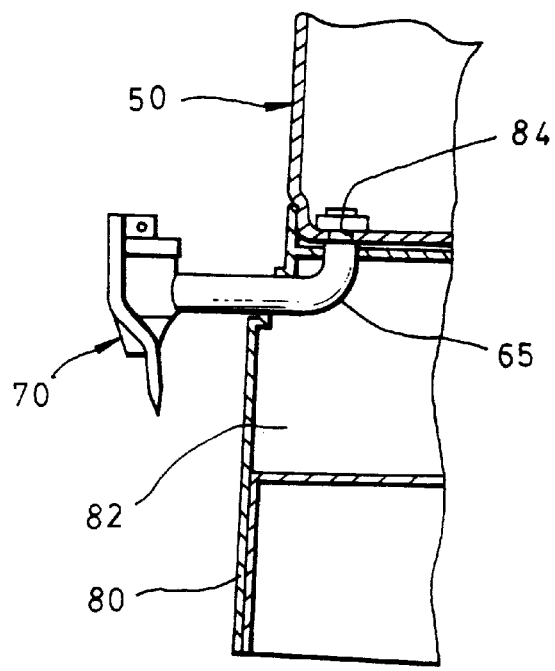
FIG. 4 is a cross-sectional view showing another embodiment of a faucet according to the present invention.

Referring to FIG.4, it is desireble that a faucet 70 protrudes from the second storage section 50 and outside of the base 80 by curved shape 65. A groove 84 is attached at the bottom surface of the transparent storage case 58, so that the purified water is easily transported from the transparent storage case 58 to the outside thereof.

Preferably, filter 12 should be a sediment filter, and the filter 16 should be zeolite filter. Furthermore, the upper filter 44 of filtering section 40 should be include an active carbon filter, an upper portion of the lower filter 64 located within the filtering section 60 should include a silicon layer, a middle portion of the lower filter 64 should consist of an active carbon layer, and a lower portion of lower filter 64 should include a somelite layer. Alternately, the upper, middle, and lower portions of the lower filter 64 can be made from a silicon, active carbon, and somelite layers, respectively.

Meanwhile, the emission rate of bio-infrared rays located within the alkalite diskette 67 should be measured under the following conditions.

Measureing machine : a FT-IR spectrum

Measuring temperature: 40° C.

Plastic temperature of alkalite diskette 67: 900° C.

Holding time: 30 min.

Emission rate of bio-infrared ray: 0.92 between 5–20 m

Emission rate : 3.72 W/m

Since the water purifier according to the present invention employs diskette 67 as described, the purified water is vitalized and ionized fairly well. Accordingly, the taste of the water is enhanced.

Accordingly, the life span of both filter 12 and filter 16 are about six months. In addition, the life span of both upper filter 44 and lower filter 64 are about twelve months. However, the life span of those filters can be appropriately extended by the filter's operation under proper condition.

Hereinafter, an operation of the apparatus for purifying water according to the present invention will be described.

Referring to FIGS. 1 to 4, the running water is first provided to the primary filter 12 from the preliminary filtering section 10, with the water passing through the first supply hose 3, which diverges from water-supply pipe 1. Then, the primary filter 12 filters solid particles and rust stains contained in the water. Next, the water filtered by the primary filter 12 is transferred to the secondary filter 16 through the connecting hose 14. The secondary filter 16 filters the residues of heavy metal contained in the water passing through connecting hose 14. Subsequently, the second supply hose 22 pumps the water filtered through the secondary filter 16 to the highest position of the apparatus through the pipe's own pressure.

The elbow 24, which is connected at an end point of the second water-supply pipe 22, changes the direction of inflowing water provided from the second water-supply pipe 22. Then, the inflow pipe 26 connected to the other of the elbow 24 guides the water to reservoir 32 located within storage section 20. Next, the purified water fills through the transparent case 58, storage case 59, and reservoir 32 in this respective order.

As water flows down by its own gravitational force from reservoir 32 through the passing holes 46 located in upper porous plate 42, the upper filter 44 of the filtering section 40 further filters and sterilizes the water. The upper porous plate 42, which contains the passing holes 46, guides the downflow of water. The supporter 41, which is connected to a lower portion of reservoir 32, collects the water passing through upper filter 44.

The water then flows down by its own gravitational force from reservoir 32 to transparent storage case 58 through the lower porous plate 63 located within filtering section 60. The lower filter 64, which located within the filtering section 60 filters and ionizes the water as it passes through ceramic case 66 and diskette 67 containing alkaloid substance.

Accordingly, the water is collected inside transparent storage case 58, which is made from transparent materials such as glass. The purified water can be consumed through faucet 70 which extends outward from the lower part of transparent storage case 58.

Next, the purified water passes through the lower inlet 52 and gets stored in the transparent storage case 58.

At this stage, float 56 detects the water level of storage space 59, which is located inside of storage case 58. Thus, the height of float 56 is continuously changed in accordance with existing water level. When the water in storage case 59 reaches a maximum level, float 56 shuts off the opening of the shut-off valve 54 so that the inflow of water could not enter into the storage case 59, or would be halted.

Subsequently, float 28 detects the water level of storage space 34 located within reservoir 32. Thus, the height of float 28 continuously changes in accordance with the existing water level of reservoir 32. When the water in the reservoir 32 reaches a maximum water level, float 28 shuts off the opening in the shut-off valve 27 so that the inflow of water could not enter into the reservoir 32, or would be halted.

Figure 3:
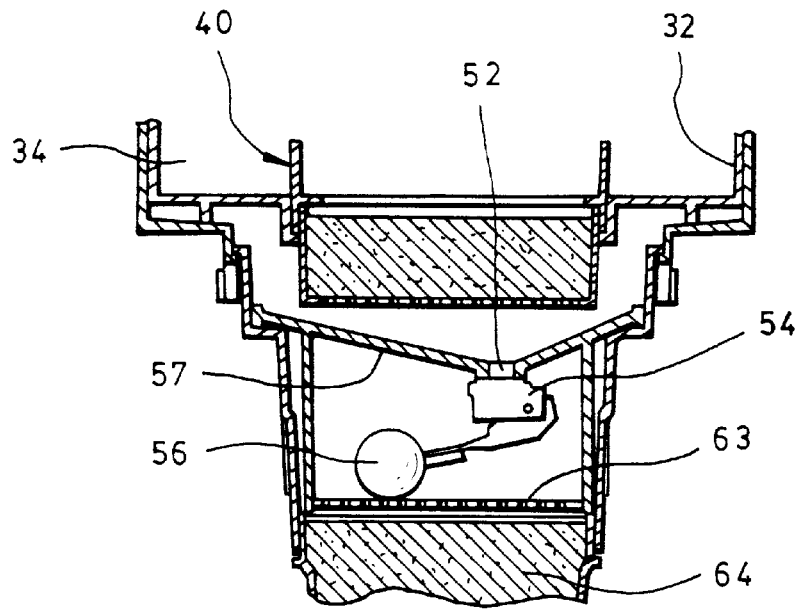
FIG. 3 is a cross-detailed sectional view showing another embodiment of the lower portion of reservoir according to the present invention.

On the contrary, if the water stored in the storage space 34 reaches a low level, float 28 also descends in accordance with the existing water level in reservoir 32. Then float 28 allows for the inflow of water from water-supply pipe 22 through elbow 24 and inflow pipe 26. Preferably, as shown in FIG.3, the lower portion 57 of reservoir 32 would form a cone shape, where the water is easily collected inside reservoir 32.

At this time, if certain amounts of purified water is consumed, the water purifier of the present invention detects the consumption of purified water and substitute the consumed water with a fresh supply of purified water without the use of an external electric power source, thus maintaining a predetermined amount of purified water accessible for further use.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. An apparatus for purifying water comprising:
   a first water-supply pipe for transporting running water with a predetermined pressure;
   a second water-supply pipe connected to said first water-supply pipe, the second water-supply pipe transporting the running water to the highest position of the water purifying apparatus;
   a first purifying section connected to said second water-supply pipe, said first purifying section temporarily storing and purifying the water provided from said second water-supply pipe as water flows down by its own gravitation force,
      wherein said first purifying section comprises a first storage section for temporarily storing the water passing through said second water-supply, and a first filtering section for filtering the water stored in said first storage section as water flows down by its own gravitational force; a second purifying section mounted below said first purifying section, said second purifying section temporarily storing and purifying the water passing through said first purifying section as water flows down by its own gravitational force,
      wherein said second purifying section comprises a second storage section for storing the water passing through said first purifying section, and a second filtering section for filtering and ionizing the water stored in said second storage section as water flows down by its own gravitational force;
   a ceramic case for projecting bio-infrared rays to the water passing through said second purifying section,
      wherein said ceramic case comprises a diskette having an alkalite component, said alkalite diskette vitalizing water into ionized water;
   a transparent storage section for storing the water passing through said ceramic case,
   wherein said first and second purifying sections detect the water levels which fill up from the bottom of said transparent storage section to said first and/or second purifying sections, thereby controlling the inflow of water from said second water-supply pipe in accordance with the existing water levels in said first and second purifying sections.

2. The apparatus for purifying water as claimed in claim 1, further comprising a preliminary filtering section connected to said first water-supply pipe and said second water-supply pipe,
   wherein said preliminary filtering section comprises a primary filter for filtering out solid particles, rust stains, and the like contained in the water provided from said first water-supply pipe, and a secondary filter for filtering out residues of heavy metal contained in that water passing through said primary filter, and
   wherein said primary filter is a sediment filter and said secondary filter is a zeolite filter.

3. The apparatus for purifying water as claimed in claim 1, wherein said first and second purifying sections respectively comprise floats for detecting the water level in said first and/or second purifying section(s), and shut-off valves for controlling the inflow of water provided by said second water-supply pipe and/or passing through said first purifying section in accordance with the water level detected by said floats, said floats being able to withstand 6 $Kg/cm^2$ of pressure.

4. The apparatus for purifying water as claimed in claim 1, wherein said alkalite component contains silicon oxide, aluminum oxide, iron oxide II, calcium oxide, and potassium oxide.

\* \* \* \* \*